(12) United States Patent
Ronning

(10) Patent No.: US 10,709,127 B2
(45) Date of Patent: Jul. 14, 2020

(54) NON-LETHAL WILDLIFE DETERRENCE AIRCRAFT LIGHTING APPARATUS

(71) Applicant: Lite Enterprises Inc., Nashua, NH (US)

(72) Inventor: Donald Ronning, Nashua, NH (US)

(73) Assignee: LITE ENTERPRISES INC., Nashua, NH (US)

( * ) Notice: Subject to any disclaimer, the term of this patent is extended or adjusted under 35 U.S.C. 154(b) by 786 days.

(21) Appl. No.: 15/287,827

(22) Filed: Oct. 7, 2016

(65) Prior Publication Data

US 2017/0099828 A1    Apr. 13, 2017

Related U.S. Application Data

(60) Provisional application No. 62/238,158, filed on Oct. 7, 2015.

(51) Int. Cl.
*A01M 29/10* (2011.01)
*A01M 29/16* (2011.01)
(Continued)

(52) U.S. Cl.
CPC ............ *A01M 29/10* (2013.01); *A01M 29/16* (2013.01); *A01M 29/32* (2013.01); *B64D 45/00* (2013.01);
(Continued)

(58) Field of Classification Search
CPC ...... A01M 29/10; A01M 29/32; A01M 29/16; B64D 47/02; B64D 45/00; B64D 2045/0095; H05B 33/086
See application file for complete search history.

(56) References Cited

U.S. PATENT DOCUMENTS 3,903,501 A    9/1975   Greenlee et al.
3,938,149 A    2/1976   Grantham
(Continued)

FOREIGN PATENT DOCUMENTS

DE          10213473       10/2003
DE       20 2007013399      7/2008
(Continued)

OTHER PUBLICATIONS

Bennett, A. T. D. and Cuthill, L C. (1994). Ultraviolet vision in birds: what is its function? Vision Res. 34,1471-1478, doi:10.1016/0042-6989(94)90149-X.
(Continued)

*Primary Examiner* — Nimeshkumar D Patel
*Assistant Examiner* — Tania Courson
(74) *Attorney, Agent, or Firm* — Grossman, Tucker, Perreault & Pfleger, PLLC

(57) ABSTRACT

A wildlife deterrence aircraft lighting apparatus includes at least one species deterrent LED to provide non-lethal deterrence of avian species (i.e., birds) within a deterrence area in an immediate flight path of an aircraft. The species deterrent LED may be configured to emit mono-colored light at a wavelength within a sensitivity range of a short-wavelength-sensitive (SWS) photoreceptor of at least one avian species and with a light intensity in at least a portion of the deterrence area sufficient to induce an augmented behavioral response. The lighting apparatus may also control the species deterrent LED(s) and aircraft lighting LED(s) independently and may provide voltage control and temperature control to enable the wildlife deterrence function without interfering with the aircraft lighting functions. The lighting apparatus may further be configured to reduce luminous flux loss and to provide thermal management to (Continued)

accommodate both wildlife deterrence and aircraft lighting functions.

25 Claims, 8 Drawing Sheets

(51) Int. Cl.
  *A01M 29/32* (2011.01)
  *B64D 45/00* (2006.01)
  *B64D 47/02* (2006.01)

(52) U.S. Cl.
  CPC ...... *B64D 47/02* (2013.01); *B64D 2045/0095* (2013.01)

(56) References Cited

U.S. PATENT DOCUMENTS

| | | | |
|---|---|---|---|
| 3,971,020 A | 7/1976 | Howard | |
| 4,736,907 A | 4/1988 | Steffen | |
| 4,952,939 A | 8/1990 | Seed | |
| 4,982,176 A | 1/1991 | Schwarz | |
| 5,128,683 A * | 7/1992 | Freedman | G01S 7/032 342/158 |
| 5,248,919 A | 9/1993 | Hanna et al. | |
| 5,270,707 A | 12/1993 | Schulte et al. | |
| 5,448,243 A | 9/1995 | Bethke et al. | |
| 5,450,063 A * | 9/1995 | Peterson | A01M 29/16 119/713 |
| 5,685,636 A | 11/1997 | German | |
| 5,774,088 A | 6/1998 | Kreithen | |
| 5,969,593 A | 10/1999 | Will | |
| 6,016,100 A | 1/2000 | Boyd et al. | |
| 6,250,255 B1 | 6/2001 | Lenhardt et al. | |
| 6,252,525 B1 | 6/2001 | Philiben | |
| 6,285,630 B1 | 9/2001 | Jan | |
| 6,328,986 B1 | 12/2001 | Ballinger, Jr. | |
| 6,407,670 B1 | 6/2002 | Dysarsz et al. | |
| 6,575,597 B1 * | 6/2003 | Cramer | F21V 33/0064 116/22 A |
| 6,653,971 B1 | 11/2003 | Guice et al. | |
| 6,681,714 B1 | 1/2004 | Johnson | |
| 6,804,607 B1 * | 10/2004 | Wood | G01S 3/784 180/167 |
| 6,906,659 B1 | 6/2005 | Ramstack | |
| 6,940,424 B2 | 9/2005 | Philiben et al. | |
| 6,980,119 B2 | 12/2005 | Toulmin et al. | |
| 7,106,216 B1 | 9/2006 | Maher | |
| 7,125,142 B2 * | 10/2006 | Wainwright | F21S 6/001 362/231 |
| 7,344,264 B2 * | 3/2008 | Tamaoki | A01M 29/08 257/E25.021 |
| 7,501,979 B1 | 3/2009 | Guice et al. | |
| 7,503,675 B2 * | 3/2009 | Demarest | A01M 1/2072 362/253 |
| 7,567,203 B2 | 7/2009 | Dizaji | |
| 7,645,053 B2 * | 1/2010 | Machi | B64D 47/06 362/241 |
| 7,701,362 B2 * | 4/2010 | Philiben | G08G 5/0008 340/961 |
| 7,783,427 B1 | 8/2010 | Woodell et al. | |
| 7,841,752 B2 * | 11/2010 | Lee | F21K 9/23 362/249.02 |
| 7,864,103 B2 | 1/2011 | Weber et al. | |
| 7,876,260 B2 | 1/2011 | Laufer | |
| 7,940,206 B2 | 5/2011 | Nohara | |
| 8,164,462 B1 | 4/2012 | Bose et al. | |
| 8,279,109 B1 | 10/2012 | Piesinger | |
| 8,474,411 B2 | 7/2013 | Scott | |
| 8,570,211 B1 | 10/2013 | Piesinger | |
| 8,616,144 B2 | 12/2013 | Yifrach | |
| 8,665,138 B2 | 3/2014 | Laufer | |
| 8,742,977 B1 | 6/2014 | Piesinger | |
| 8,810,411 B2 | 8/2014 | Marka | |
| 9,258,992 B2 * | 2/2016 | Shefer | E02D 29/14 |
| 9,345,095 B2 * | 5/2016 | Yan | H05B 33/0857 |
| 9,474,265 B2 * | 10/2016 | Duncan | A01M 29/10 |
| 9,521,830 B2 * | 12/2016 | Wenger | G06T 7/20 |
| 9,675,059 B2 * | 6/2017 | Waldman | A01M 31/002 |
| 9,706,765 B2 * | 7/2017 | Lee | A01M 29/10 |
| 10,220,959 B2 * | 3/2019 | Khawam | B64D 47/06 |
| 10,321,672 B2 * | 6/2019 | Ronning | A01M 29/10 |
| 2002/0093820 A1 * | 7/2002 | Pederson | B60Q 1/2611 362/241 |
| 2003/0090391 A1 | 5/2003 | Philiben et al. | |
| 2003/0122680 A1 | 7/2003 | Ardelan et al. | |
| 2005/0145162 A1 * | 7/2005 | Marcus | A01M 29/06 116/22 A |
| 2005/0162978 A1 | 7/2005 | Lima | |
| 2006/0077663 A1 * | 4/2006 | De Ginto | A01M 29/10 362/276 |
| 2006/0109161 A1 | 5/2006 | Krikorian | |
| 2006/0174533 A1 * | 8/2006 | Rusciano | A01M 29/10 43/1 |
| 2007/0001897 A1 | 1/2007 | Alland | |
| 2007/0086912 A1 | 4/2007 | Dowling et al. | |
| 2007/0190343 A1 | 8/2007 | Arkles | |
| 2008/0260531 A1 | 10/2008 | Stommel | |
| 2008/0266171 A1 | 10/2008 | Weber et al. | |
| 2008/0298962 A1 | 12/2008 | Sliwa | |
| 2009/0034259 A1 | 2/2009 | Laufer | |
| 2009/0165732 A1 | 7/2009 | Farley | |
| 2009/0179759 A1 | 7/2009 | Koury | |
| 2009/0190355 A1 * | 7/2009 | DeGinto | A01M 29/10 362/276 |
| 2010/0192834 A1 * | 8/2010 | Fogiel | A01M 29/16 116/22 A |
| 2010/0201525 A1 | 8/2010 | Bahat et al. | |
| 2010/0226122 A1 * | 9/2010 | Tsai | A01M 29/10 362/231 |
| 2010/0236497 A1 | 9/2010 | Philiben | |
| 2011/0144829 A1 | 6/2011 | Kim et al. | |
| 2011/0163694 A1 | 7/2011 | Donners | |
| 2011/0203149 A1 | 8/2011 | Grajcar | |
| 2011/0260907 A1 | 10/2011 | Roche | |
| 2012/0038504 A1 | 2/2012 | Yu et al. | |
| 2012/0113754 A1 * | 5/2012 | Husseiny | A01M 29/16 367/139 |
| 2013/0229125 A1 * | 9/2013 | Yan | H05B 33/0857 315/210 |
| 2013/0257641 A1 | 10/2013 | Ronning | |
| 2013/0320103 A1 * | 12/2013 | Margalit | B64D 45/00 239/1 |
| 2014/0036502 A1 | 2/2014 | Peck | |
| 2014/0148978 A1 * | 5/2014 | Duncan | A01M 29/10 701/3 |
| 2014/0261151 A1 | 9/2014 | Ronning | |
| 2014/0336263 A1 * | 11/2014 | Krebs | A01M 31/002 514/627 |
| 2016/0029615 A1 * | 2/2016 | Newcamp | A01M 29/10 119/713 |
| 2017/0164603 A1 * | 6/2017 | Kovarik | A01M 29/10 |
| 2019/0183109 A1 * | 6/2019 | Henskes | A01M 29/10 |

FOREIGN PATENT DOCUMENTS

| | | |
|---|---|---|
| WO | WO 2006118449 | 11/2006 |
| WO | WO 2010023253 | 3/2010 |

OTHER PUBLICATIONS

Collin SP, Davies WL, Hart NS, Hunt DM. The evolution of early vertebrate photoreceptors. Philosophical Transactions of the Royal Society B: Biological Sciences. 2009;364(1531):2925-2940. doi:10.1098/rstb.2009.0099.

Xuan Fujun, et.al, Behavioral evidence for cone-based ultraviolet vision in divergent bat species and implications for its evolution, Zoologia 29 (2): 109-114, Apr. 2012, doi: 10.1590/S1984-4670201200020000.

(56) References Cited

OTHER PUBLICATIONS

W. T. Allison, et. al., Degeneration and regeneration of ultraviolet cone photoreceptors during development in rainbow trout, vol. 499, Issue 5, pp. 702-715, Dec. 10, 2006, DOI: 10.1002/cne.21164.

J. Engelage, H.J. Bischof, (1993), Vision, brain, and behavior in birds, the organization of the tectofugal pathway in birds: a comparative view, eds Zeigler HP, Bischof HJ (MIT, Cambridge, MA), pp. 137-158.

G. Marin G, C. Salas, et. al., (2007), A cholinergic gating mechanism controlled by competitive interactions in the optic tectum of the pigeon. J Neurosci 27:8112-8121.

Givago Da Silva Souza, et. al., (2011) Comparative neurophysiology of spatial luminance contrast Sensitivity, Psychology & Neuroscience, 2011, 4, 1, 29-48, DOI: 10.3922/j.psns.2011.1.005.

S. Solomon, et. al., May 4, 2005, Chromatic Organization of Ganglion Cell Receptive Fields in the Peripheral Retina, The Journal of Neuroscience, 25(18): 4527-4539; doi: 10.1523/JNEUROSCI.3921-04.2005.

D. Hunt, et al., (Aug. 31, 2009), Evolution and spectral tuning of visual pigments in birds and mammals, Philosophical Transactions B of the Royal Society Volume: 364 Issue: 1531, DOI: 10.1098/rstb.2009.0044.

E. Warrant, et. al., The Remarkable Visual Abilities of Nocturnal Insects: Neural Principles and Bioinspired Night-Vision Algorithms, Proceedings of the IEEE Oct. 2014; 102(10):1411-1426. DOI: 10.1109/JPROC.2014.2332533.

M. Mischaiati, et. al, (2015) Internal models direct dragonfly interception steering, Nature 517, 333-338, (Jan. 15, 2015) doi:10.1038/nature14045.

S. Kane, et. al., When hawks attack: animal-borne video studies of goshawk pursuit and prey-evasion strategies, Jan. 15, 2015 J Exp Biol 218, 212-222, doi: 10.1242/jeb.108597.

Y. Hazan, et. al., Published online Feb. 13, 2015, Visual-auditory integration for visual search: a behavioral study in barn owls Front Integr Neurosci. 2015; 9: 11 doi: 10.3389/fnint.2015.00011.

Osorio, D. et.al., Sep. 2008,A review of the evolution of animal color vision and visual communication signals, Vision Research, vol. 48, Issue 20, pp. 2042-2051, doi:10.1016/tvisres.2008.06.018.

Thomson R., et. al, (2006) Fear factor: prey habitat selection and its consequences in a predation risk landscape, Ecography, vol. 29, Issue 4, pp. 507-514, Aug. 2006, DOI: 10.1111/j.0906-7590.2006.04568x.

Westneat, D., Fox C., (2010), Evolutionary Behavioral Ecology, Chapter 27, p. 553, Oxford University Press, ISBN 0195331931, 9780195331936.

Stevens M., et. al, (2009) Studying Primate Color: Towards Visual Systems-dependent Methods, Int J Primatol 30:893-917, doi:10.1007/s10764-009-9356-z.

Osorio, D. et. al., Camouflage and Perceptual Organization in the Animal Kingdom, The Oxford Handbook of Perceptual Organisation, Online Publication Date: Aug. 2014, DOI: 10.1093/oxfordhb/9780199686858.013.044.9.

Doppler M., et al. "Cowbird responses to aircraft with lights tuned to their eyes: Implications for bird-aircraft collisions." The Condor 117.2 (2015): 165-177.

Lind O.E, et. al., Multifocal optical systems and pupil dynamics in birds, Sep. 1, 2008 J Exp Biol 211, 2752-2758, doi: 10.1242/jeb.018630.

Moayed A., et. al., Stimulus-Specific Pupil Dynamics Measured in Birds (*Gallus gallus domesticus*) In Vivo with Ultrahigh Resolution Optical Coherence Tomography, Investigative Ophthalmology & Visual Science Oct. 2012, vol. 53, 6863-6869. doi:10.1167/iovs.12-10291.

Rozanowska, Nov./Dec. 2012, Light-Induced Damage to the Retina: Current Understanding of the Mechanisms and Unresolved Questions: A Symposium-in-Print, Photochemistry and Photobiology, vol. 88, Issue 5, pp. 1303-1308, http://dx.doi.org/10.1111/j.1751-1097.2012.01240.x.

Zele, A, et al., (Jan. 2015), Vision under mesopic and scotopic illumination, Frontiers in Psychology. vol. 6, Issue 5, No. 594, DOI: 10.3389/fpsyg.2015.0059si.

Vorobyev, M., & Osorio, D. (1998), Receptor noise as a determinant of colour thresholds, Proceedings of the Royal Society B: Biological Sciences, 265(1394), 351-358).

Johnson G. M., Fairchild M. D., 2001, On contrast sensitivity in an image difference model, Proc. of IS&T PICS Conference, pp. 18-23.

Hart, N. S., The visual ecology of avian photoreceptors, Progress in Retinal and Eye Research, vol. 2001; 20(5): 675-703, ISSN: 1350-9462.

International Search Report and Written Opinion dated Dec. 29, 2016 in corresponding PCT Patent Application No. PCT/US2016/055994.

Ronning, Wildlife Deterrence from Hazards Using High Brightness Ultraviolet Light, J. Chem. Chem. Eng. 10 (2016) 109-119; doi:10.17265/1934-7375/2016.03.001.

Ronning, D., S. Pelletier, C.R. Foss and T. Scott. 2015. 'Turn that light off please': Update on the use of a non-lethal wildlife deterrence device. Proceedings of the North American Birdstrike Conference 15. 38 pages. Presentation to Bird Strike Canada/Bird Strike Committee USA Conference, Montreal, Canada, Sep. 15, 2015.

Ronning, Donald (Lite Enterprises, Inc); Steve Pelletier, Trevor Peterson (Stantec Consulting Services) "Bird and Bat Mortality Reduction Using High Intensity Ultraviolet Lights." Poster presentation to National Wind Coordinating Collaborative Wind Wildlife Research Meeting IX, Nov. 27-30, 2012, Denver, Colorado.

Lite Enterprises presentation "Animal Deterrence System" to Federal Aviation Administration, Washington, DC Mar. 22, 2013.

Ronning, Donald, Carol R. Foss PhD, Peter Stocks, Lite Enterprises, INc., NH Audobon, Calendar Island Mussel Company presentation "High Brightness LEDs Deter Eider Predation at Mussel Rafts" to Northeast Aquaculture Conference, Jan. 2015.

Lite Enterprises, Inc. poster presentation "Wildlife Deterrence from Hazards Using High Brightness Ultraviolet Light" to NSF SBIR Workshop, Atlanta, Georgia, Jun. 2015.

Ronning, Donald presentation "Airport Birdstrike Mitigation Using High Intensity Monochromatic LEDs" to Illuminating Engineering Society of North America IES-ALC 2015 Fall Technology Meeting, Denver, Colorado, Oct. 22, 2015.

Ronning, Donald presentation "Seeing the Light: A New Aircraft-Based, Non-Lethal Wildlife Deterrence Device" to Bird Strike/Bird Strike Committee USA, Chicago, Illinois, Aug. 11, 2016.

European Search Report dated May 4, 2015 in Application No. 12832972.9 for PCT/US2012055977.

Chen Weishi et al: "Avian radar system based on two scanning modes," Journal of Beijing University of Aeronautics and Astronautics, vol. 35, No. 3, Mar. 1, 2009, pp. 380-383 XP055173767 (cited in European Search Report dated May 4, 2015 in Application No. 12832972.9 for PCT/US2012055977). Unable to find English language equivalent or English language abstract.

Odeen et al., Complex Distribution of Avian Color Vision Systems Revealed by Sequencing the SWS1 Opsin from Total DNA, Mol. Bio and Evol. 20(6):855-861 (2003).

O'Rourke, C, Hawk Eyes I: Diurnal Raptors Differ in Visual Fields and Degree of Eye Movement, PLoS One 5(9): e12802 (2010).

Willems, E., et al. Predator-specific landscapes of fear and resource distribution: effects on spatial range use, Ecology, 90(2): 546-555 (2009).

Odido, D. et al. Emerging Technologies: Use of Unmanned Aerial Systems in the Realisation of Vision 2030 Goals in the Counties, Intl'l J. of App. Sci. and Tech. 3(8):107-127 (2013).

Vasarhelyi, Cs. et al., Outdoor flocking and formation flight with autonomous aerial robots, IROS 2014 Conference, http://arxiv.org/ftp/arxiv/papers/1402/1402.3588.pdf (2014).

Harris, R. et al., Evaluation of the Efficacy of Products and Techniques for Airport Bird Control, Transport Canada, 1-107 (1998).

Sauter, J. et al., Demonstration of Swarming Control of Unmanned Ground and Air Systems in Surveillance and Infrastructure Protection, IEEE Int'l Conference on Technologies for Homeland Security (2009).

(56) References Cited

OTHER PUBLICATIONS

Madin, E., et al. Do Behavioral Foraging Responses of Prey to Predators Function Similarly in Restored arid Pristine Foodwebs? PLoS One 7(3):1-9 (2012).

Kocher, T., Adaptive Evolution and Explosive Speciation: The Cichlid Fish Model, Nature Reviews Genetics, 5:288-298 (2004).

Spady, T., et al., Adaptive Molecular Evolution in the Opsin Genes of Rapidly Speciating Cichlid Species, Mol. Biol. Evol., 22(6):1412-1422 (2005).

Ramsay, A., et al. Mitigating the Impact of Sea Duck Predation on PEI Mussel Farms; Prince Edward Island Aquaculture Alliance, http://www.aquaculturepei.com/media/news_industry/news_industry3.pdf (2011).

Hastad, O. et al., Ultraviolet vision and foraging in dip and plunge diving birds, Bio. Lett. 1:306-309 (2005).

Zhao, H. et al., The evolution of color vision in nocturnal mammals, PNAS, 106(22):8980-8985 (2009).

Wang, D. et al., Molecular Evolution of Bat Color Vision Gen Mol. Biol. Evol., 21(2):295-302 (2004).

Leech, D. et al., Behavioral responses—UVR avoidance and vision, Royal Society of Chemistry, Cambridge, UK, 455-481 (2003).

Sabbah, S., et al., Functional diversity in the color vision of cichlid fishes, BMC Biology, 8(1):133 (2010).

Leigh, R. et al., Finding Attack Strategies for Predator Swarms Using Genetic Algorithms, in Proc. Congress on Evolutionary Computation, 2422-2428 (2005).

Odeen, A. et al., Evolution of ultraviolet vision in the largest avian radiation—the passerines, BMC Evolutionary Biology, 11:313, http://www.biomedcentral.com/1471-2148/11/313 (2011).

Moore, B. et al., Oblique color vision in an open-habitat bird; spectral sensitivity, photoreceptor distribution and behavioral implications, The Journal of Experimental Biology 215:3442-3452 (2012).

Peichl, L., Diversity of mammalian photoreceptor properties: adaptations to habitat and lifestyle? Anat Rec 287:1001-1012 (2005).

Seibold, I., Genetic Differentiation and Molecular Phylogeny of European Aquila Eagles according to Cytochrome b Nucleotide Sequences, Meyburg B-U & R.D. Chancellors eds., Eagle Studies, World Working Group on Birds of Prey (1996).

Tucker, V.A., The Deep Fovea, Sideways Vision and Spiral Flight Paths in Raptors, The Journal of Experimental Biology 203:2745-3754 (2000).

U.S. Office Action dated Sep. 20, 2018 in corresponding U.S. Appl. No. 15/287,811.

\* cited by examiner

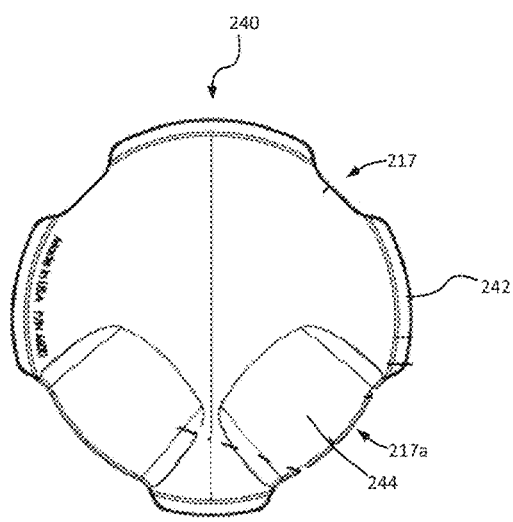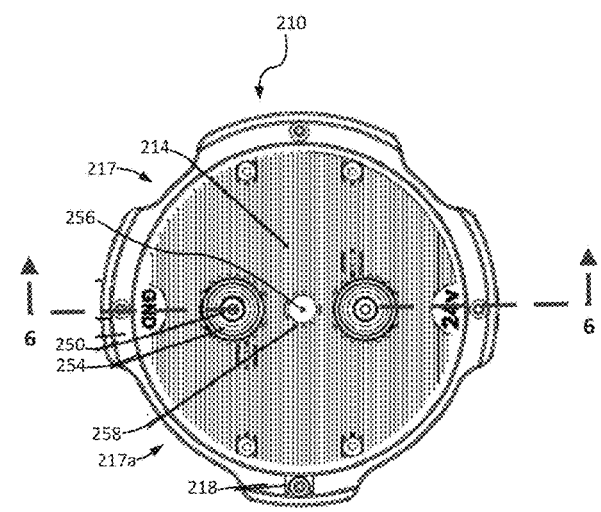
FIG. 4
FIG. 5

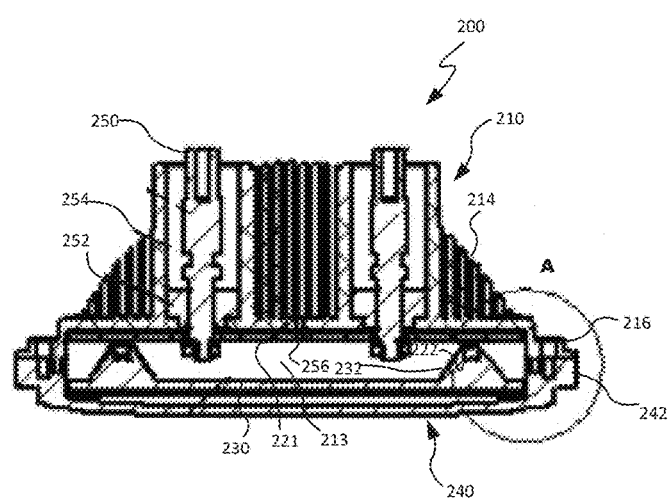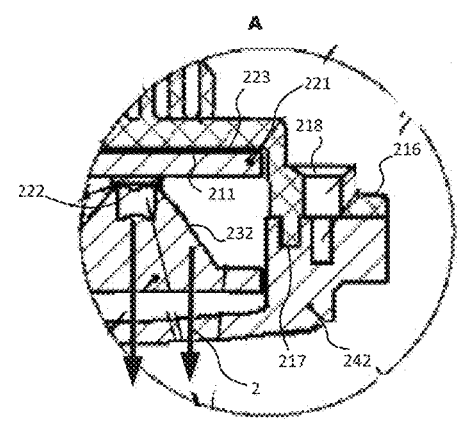
FIG. 6
FIG. 6A

NON-LETHAL WILDLIFE DETERRENCE AIRCRAFT LIGHTING APPARATUS

CROSS REFERENCE TO RELATED APPLICATIONS

The present application claims the benefit of U.S. Provisional Patent Application No. 62/238,158, filed on Oct. 7, 2015, which is incorporated herein by reference in its entirety.

STATEMENT REGARDING FEDERALLY SPONSORED RESEARCH OR DEVELOPMENT

This invention was made with U.S. government support under Grant Number IIP-1215067 and Grant number IIP-1350562, awarded by the National Science Foundation. The government has certain rights in this invention.

TECHNICAL FIELD

The present disclosure relates to wildlife deterrence, and more particularly, to a non-lethal wildlife deterrence aircraft lighting apparatus.

BACKGROUND

Wildlife can prove to be a serious problem in several different ways and wildlife deterrence may be desirable in certain areas for the benefit of the area, the activity within the area, the individuals using the area and/or the wildlife. Wildlife deterrence may be desirable, for example, to keep wildlife from in-flight aircraft. The risk of bird strikes on aircraft is a concern worldwide. Aircraft engines are particularly vulnerable during the takeoff phase when the engine is turning at a very high speed and the plane is at a low altitude where birds are more commonly found. Flocks of birds are particularly dangerous and can lead to multiple strikes. Crashes may even occur when the aircraft is not able to recover in time.

Developing effective, non-lethal methods for wildlife deterrence, which are also minimally invasive to humans, has been a challenge. Non-lethal methods using frightening noises or sights have been used in controlling transient migratory species, but the effectiveness of these techniques is often short-lived. Animal management methods, such as habitat modification, intended to deprive animals of food, shelter, space and water on or around a protected area, have been the most effective long term tactic. While these techniques that modify the habitat can reduce the risk, these methods are only partially effective and have a limited geographic range. Moreover, combining non-lethal wildlife deterrence with aircraft lighting is particularly challenging given the importance of properly functioning aircraft lights to the safety of the passengers.

SUMMARY

Consistent with one embodiment an aircraft lighting apparatus includes a plurality of light emitting diodes (LEDs) configured to generate light and direct the light from an aircraft to a deterrence area in a flight path of the aircraft. At least one of the LEDs is a species deterrent LED configured to emit mono-colored light at a wavelength within a sensitivity range of a short-wavelength-sensitive (SWS) photoreceptor of at least one avian species and with a light intensity in at least a portion of the deterrence area sufficient to cause a temporary disruption of visual perception in the avian specie(s) to induce an augmented behavioral response in the avian species resulting in avoidance of the deterrence area by the avian species.

Consistent with another embodiment, an aircraft lighting apparatus includes a plurality of light emitting diodes (LEDs) configured to generate light and direct the light from an aircraft to a deterrence area in a flight path of the aircraft. The plurality of LEDs include at least one aircraft lighting LED configured to emit white light to perform an aircraft lighting function and at least one species deterrent LED configured to emit light at a wavelength to perform a wildlife deterrence function. The aircraft lighting apparatus also includes at least one LED driver coupled to the LEDs for driving the LEDs and at least one controller coupled to the at least one LED driver and configured to control the aircraft lighting LED(s) and the species deterrent LED(s) independently to perform the aircraft lighting function and the wildlife deterrence function.

Consistent with a further embodiment, an aircraft lighting apparatus includes a housing defining a light exiting opening, an LED holder located in the housing, and a plurality of light emitting diodes (LEDs) arranged on the LED holder in the housing. The plurality of LEDs include at least one aircraft lighting LED configured to emit white light to perform an aircraft lighting function and at least one species deterrent LED configured to emit light at a wavelength to perform a wildlife deterrence function. The aircraft lighting apparatus also includes a reflector arrangement located in the housing and a protective cover lens covering the light exiting opening and allowing the light to pass through. The reflector arrangement includes a plurality of reflector sections corresponding to the plurality of LEDs and configured to reflect light in a longitudinal direction toward the light exiting opening.

BRIEF DESCRIPTION OF THE DRAWINGS

These and other features and advantages will be better understood by reading the following detailed description, taken together with the drawings wherein:

FIG. 4 is a front view of the wildlife deterrence aircraft lighting apparatus shown in FIG. 3.

FIG. 5 is a rear view of the wildlife deterrence aircraft lighting apparatus shown in FIG. 3.

FIG. 6 is a cross-sectional view of the assembled wildlife deterrence aircraft lighting apparatus taken along line 6-6 in FIG. 5.

FIG. 6A is an enlarged view of a section A of the wildlife deterrence aircraft lighting apparatus shown in FIG. 6.

DETAILED DESCRIPTION

Figure 1:
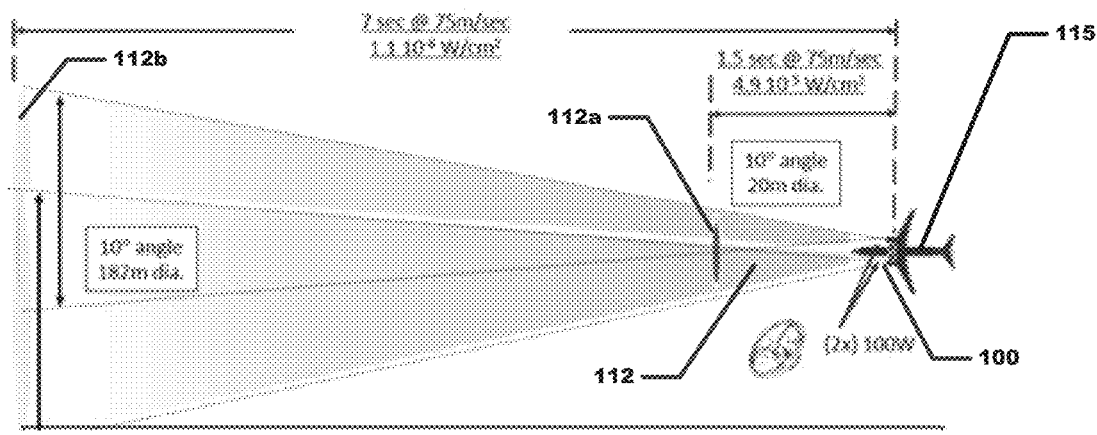
FIG. 1 is a top view of an aircraft including a wildlife deterrence aircraft lighting apparatus, consistent with embodiments of the present disclosure.

An aircraft lighting apparatus, consistent with embodiments described herein, includes at least one species deterrent LED to provide non-lethal deterrence of avian species (i.e., birds) within a deterrence area in an immediate flight path of an aircraft. The species deterrent LED may be configured to emit mono-colored light at a wavelength within a sensitivity range of a short-wavelength-sensitive (SWS) photoreceptor of at least one avian species and with a light intensity in at least a portion of the deterrence area sufficient to cause a temporary disruption of visual perception in the at least one avian species. The disruption of visual perception induces an augmented behavioral response in the avian species resulting in avoidance of the deterrence area by the avian species. A combined wildlife deterrence and aircraft lighting apparatus may include the species deterrent LED(s) together with at least one aircraft lighting LED to provide a concurrent mode of operation. The lighting apparatus may also control the species deterrent LED(s) and aircraft lighting LED(s) independently and may provide voltage control and temperature control to enable the wildlife deterrence function without interfering with the aircraft lighting function. The lighting apparatus may further be configured to reduce luminous flux loss and to provide thermal management to accommodate both wildlife deterrence and aircraft lighting functions.

Non-lethal wildlife deterrence systems and methods, consistent with the embodiments described herein, relate to the role that the oculo-neuro-motor network plays in the neurophysiology of animal species and how they perceive and interact with their surrounding environment. More specifically, the wildlife deterrence systems and methods involve the disruption of the oculo-neuro-motor responses through the use of mono-colored light of a sufficient intensity to defeat the normal ability to process the sensor information leading to changes in behavior in a nonlethal manner. The morpho-physiological organization of the visual system is dependent upon the unique characteristics of the eye, the post-receptoral mechanisms of the neuro pathways, and the oculo-neuro-motor mechanisms. Different species (e.g., mammal and avian species) exhibit differences in contrast sensitivity, spatial frequency sensitivity, rod/cone concentration and location, which contribute to behaviors of a particular species within its environment.

Behavioral responses to visual stimulus involve several steps. The initiation of vision involves the transduction of light striking the eye to create nerve signals as the visual impulse. Photons striking a photoreceptor with sufficient intensity and appropriate energy (e.g., wavelength) will cause a photochemical reaction creating a nerve impulse that is transmitted to ganglia cells. Signals originating in several photoreceptors pass through a single bipolar cell to a single ganglion cell resulting in synaptic convergence. The ganglia cells are connected to the second cranial nerve (i.e., the optic nerve), which transmits visual information to the vision centers of the brain. In an avian species, the optic nerve is generally larger than the spinal nerve because of the importance of vision to the avian species. Certain mechanisms involved with visual perception may be used to confuse or overwhelm the oculo-neuro network such that the neurophysiological blocking mechanism of the visual system temporarily defeats or disrupts the visual perception of a species, similar to "jamming" mechanisms used to defeat a radar system.

The ability to visualize objects involves the ability to distinguish contrasts and the ability to perceive colors, which differs among different species. The ability to distinguish contrasts may be measured and represented as contrast sensitivity or the contrast sensitivity function (CSF). Humans and monkeys are capable of accommodating about 120:1 ratio light contrast, for example, while avian species are capable of accommodating 12:1 ratio light contrast. As such, the avian species are recognized as having better visual acuity and lower dynamic range compared to humans. The ability to perceive colors involves different types of retinal photoreceptor cells, known as cone cells, which have different but often overlapping absorption spectra or spectral sensitivities. Humans have trichromatic color vision with three distinct types of cones for short (S), medium (M) and long (L) wavelengths; whereas avian species have tetrachromatic color vision with four distinct types of cones including (unlike humans) short-wavelength-sensitive (SWS) cones having sensitivity extending to the ultra-violet (UV) range.

The perception of color is achieved by a process that starts with the differential output of the cone cells and is finalized in the visual cortex and associative areas of the brain. According to the opponent-process theory of color vision, color perception is controlled by the activity of two or more opponent photoreceptor systems. In particular, the medium (M) and long (L) wavelength cones often operate in tandem and the UV and short (S) wavelength cones often operate in tandem. The SWS cones (e.g., UV and S) are often a small percentage of the total cones in the retina and are distributed throughout the retina with a non-uniform density. Thus, the contribution of the SWS cones to the neurological signals is often disproportionately higher than the M and L cones. The mechanism of augmented behavioral response invoked by embodiments of the wildlife deterrence systems and methods described herein involve the contribution of the SWS cones to the dynamic range of neurological signals from the ganglia to the brain, which is disproportionately high compared to the number of SWS cones actually present. Thus, the most effective wavelengths for inducing an augmented behavioral response in a species involve the SWS cones of a species.

The cone-opponent neuro signal processing mechanism is analogous to an electrical circuit design having a limited dynamic range. Exceeding the dynamic range of the circuit results in a saturated signal in which no information can be derived. Similarly, mono-colored light within the sensitivity range of SWS cones of a species and with an intensity exceeding the dynamic range is capable of inducing a saturated neuro signal. Wavelengths closely matched to the SWS cones (e.g., blue or ultraviolet) of the species (i.e., within 25 nm of a peak absorption wavelength) are likely to maximize the effect of the cone-opponent neuro signal processing. A mismatch between the wavelength of the mono-colored light and the peak absorption spectrum of the SWS cones of the species may be compensated by increasing the intensity of the mono-colored light striking the cone.

Light adaptation decreases the sensitivity of the eye to light sources with a higher luminance than a previous level and may result in a saturated neuro signal coming back into a dynamic range in which perceptual information may be obtained. An augmented behavioral response may still be induced by generating mono-colored light at a sufficient intensity to exceed a light adjusted CSF threshold intensity (e.g., as defined by the brightness of the illumination region of the image of the light adapted eye plus the CSF ratio). Light adaption occurs in a sequence of reactions including behavioral avoidance of bright lights, pupil contraction, depletion of photopigment, and cellular adaptation. Light adaptation may also accompanied by a temporary loss in contrast sensitivity at higher luminance levels. Confusion of the color blending functions of the signals from the photoreceptors results in impaired visual perception. This condition is similar to when humans experience a bright light source such a solar glint or solar glare and has difficulty "seeing." Conversely, if the eye becomes light adapted to the light sources with a higher luminance which is suddenly turned OFF, then a depleted neuro signal is below the dynamic range in which perceptual information may be obtained. This condition is similar to when humans enter a dimly lit room immediately after being exposed to bright sunlight or other bright light source and has difficulty "seeing."

Thus, intermittent pulses of mono-colored light may keep the eye in a constant unstable state, preventing the eye from adapting. The change in the pupil size modifies a set point of the CSF that the eye accommodates and the repetition of additional series of pulses induces the vision system to attempt to adapt to a constantly changing set of light conditions. When the ocular-neuro network is overwhelmed in this manner, the ability of the species to maintain visual perception is effectively defeated. This overwhelmed neurological condition results in the interference of neurophysiological processes of the vision system and brain controlling edge detection, motion, optical flow, afterimage, illusions and flicker fusion and may also induce neurophysical illusions. Humans generally do not perceive flicker rates greater than 30 Hz, whereas some avian species can perceive flicker rates greater than 100 Hz.

Field experiments were conducted with a variety of avian species, namely, Osprey, Red-tailed Hawk and the Common Eiders. The tests involved wild species in their natural environments pursuing their natural food sources. Mono-colored high brightness LEDs were placed in visible location in close proximity to the preferred food sources of the three species. The peak spectral emission LED tested included 365 nm, 385 nm, 395 nm, 405 nm, 435 nm, 455 nm, and 470 nm. The 395 nm LED was found to be effective in modifying foraging and nesting behaviors of Osprey and foraging behaviors of Common Eiders. Also, the 455 nm LED was found to be effective in modifying the foraging behaviors of the Red-tailed Hawk. Osprey, Common Eider, and species similar to the Red-tailed Hawk have VS type cones. The difference in behavior of the species was observed when the light was ON and when the light was OFF. With all three species, when the LED was ON, the avian species that approached the food source waited for an extended period of time from a safe distance from the LEDs. As the distance between birds and the mono-colored LEDs decreased, the intensity of behavioral response increased, ranging from subtle changes of flight direction or altitude to complete reversal of flight direction. The safe distance may correlate with the upper limit of the CSF range at which they could observe the food source. If the birds decreased the distance to the LEDs, they exhibited an augmented behavioral response and rarely pursued the food source after such a response.

As used herein, the term "contrast sensitivity function (CSF)" refers to the inverse of the contrast detection threshold (i.e., the lowest contrast at which a pattern can be seen) as a function of spatial frequency and light intensity and is a measure of the ability of a species to detect contrast (and thus to visualize objects). As used herein, "light adjusted CSF threshold intensity" refers to the light intensity at a limit of the dynamic range of the light adjusted eye of a species above which a saturated neuro signal occurs resulting in a substantial loss of contrast sensitivity. As used herein, "augmented behavioral response" refers to a distinct behavioral action made in response to a non-natural stimulus that overwhelms or confuses the oculo-neuro-motor network.

As used herein, the term "sensitivity range" refers to a range of wavelengths that may be detected by a photoreceptor and the term "peak absorption wavelength of a short-wavelength-sensitive (SWS) photoreceptor" refers to a wavelength with a peak absorbance within the sensitivity range of wavelengths that can be detected by the SWS photoreceptor of the species. As used herein, the term "mono-colored" refers to light having a relatively narrow bandwidth within 15-20 nanometers (nm) of a spectrum peak and a "mono-colored" LED generates only light within this narrow spectrum. As used herein, the term "high brightness" refers to LEDs that operate with a high emission power efficiency, greater than 20%. The LEDs may include, for example, LED chips with multiple individual LED die packaged into a single light emitting component requiring from 3 to 100 watts and sometimes more of input power.

Referring to FIG. 1, a wildlife deterrence aircraft lighting apparatus 100, consistent with embodiments of the present disclosure, is used on an aircraft 115 to deter avian species from entering an airspace 112 in the immediate path of the aircraft 115 during flight. The wildlife deterrence aircraft lighting apparatus 100 may combine the wildlife deterrence function with an aircraft lighting function, such as landing lights and/or taxi lights, in a single apparatus. In other embodiments, the wildlife deterrence aircraft lighting apparatus 100 may be a separate lighting apparatus for wildlife deterrence used together with landing lights and/or taxi lights.

The wildlife deterrence aircraft lighting apparatus 100 includes light sources located on the aircraft 115 to direct the light (e.g., in the form of a narrowly focused beacon of light) to a deterrence area in the airspace 112 in the immediate path of the aircraft 115. The light sources may be capable of emitting light with a divergence angle to provide the desired intensity across a distance of at least a width of the aircraft 115 and with an intensity capable of inducing an augmented behavioral response before the aircraft 115 reaches the location of the bird.

In one example, light emitted at 100 W with a divergence angle of 10° may provide an intensity of about $4.9 \times 10^{-5}$ W/cm$^2$ across a diameter of about 20 m at a location 112a about 112.5 m in front of the aircraft 115. This should induce an augmented behavioral response in a bird within this area causing the bird to leave the area with enough time (e.g., 1.5 s for an aircraft traveling at 75 m/s) before the aircraft 115 reaches the location. The light will continue to diverge at greater distances from the aircraft 115 with a decreasing intensity. The light emitted at 100 W with a divergence angle of 10° may provide an intensity of about $1.1 \times 10^{-6}$ W/cm$^2$ across a diameter of about 182 m at a location 112b about 125 m in front of the aircraft 115. At these further distances, the intensity of the light may not be sufficient to induce a neurophysical response but may still be sufficient to induce a voluntary or aversion response, such as discomfort, panic, stress or heightened awareness, which may cause some deterrence at these greater distances.

The wildlife deterrence aircraft lighting apparatus 100 generally includes a plurality of light emitting diodes (LEDs) configured to generate the light and direct the light from the aircraft to the deterrence area in the airspace 112. At least one of the LEDs may be a species deterrent LED that emits mono-colored light at a wavelength within a sensitivity range of a short-wavelength-sensitive (SWS) photoreceptor of at least one avian species, such as a violet sensitive (VS) cone of the avian species and/or an ultraviolet sensitive (UVS) cone of the avian species. The species deterrent LED(s) also emit the mono-colored light with a light intensity in at least a portion of the deterrence area sufficient to cause a temporary disruption of visual perception in the at least one avian species. The temporary disruption of visual perception should induce an augmented behavioral response in the avian species resulting in avoidance of the deterrence area by the avian species.

In particular, the species deterrent LED may include one or more blue LEDs emitting blue light with a bandwidth of less than +/−15 nm and a peak spectrum emission between 400 nm and 470 nm, one or more near UV LEDs emitting near UV light with a bandwidth of less than +/−15 nm and a peak spectrum emission between 380 nm and 400 nm, and one or more UV LEDs emitting UV light with a band width of less than +/−15 nm and a peak spectrum emission between 355 nm and 380 nm.

The aircraft lighting apparatus 100 may also include one or more aircraft lighting LEDs configured to emit white light for providing the aircraft lighting. The white light may have a color temperature in a range of 3000 to 5500 degrees Kelvin. In this embodiment, the aircraft lighting apparatus 100 may control the species deterrent LED(s) and the aircraft lighting LED(s) independently to provide both the non-lethal wildlife deterrence function and the aircraft lighting function simultaneously. The aircraft lighting apparatus 100 may also provide voltage control and temperature control to enable both functions (i.e., primarily the aircraft lighting function and secondarily the wildlife deterrence function) within voltage and temperature constraints, as will be described in greater detail below. The aircraft lighting apparatus 100 may also be designed and configured to minimize or reduce loss of luminous flux and to provide thermal management to enable both functions simultaneously, as will be described in greater detail below.

Figure 2:
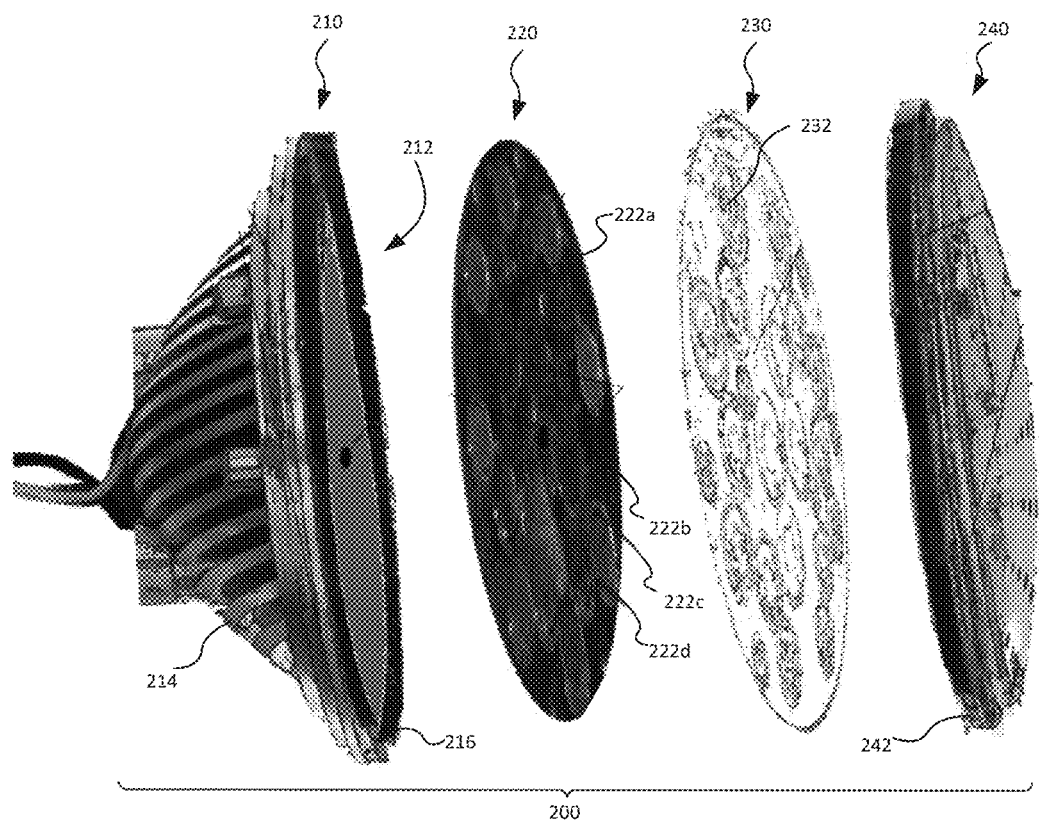
FIG. 2 is an exploded front perspective view of an embodiment of a wildlife deterrence aircraft lighting apparatus.
Figure 3:
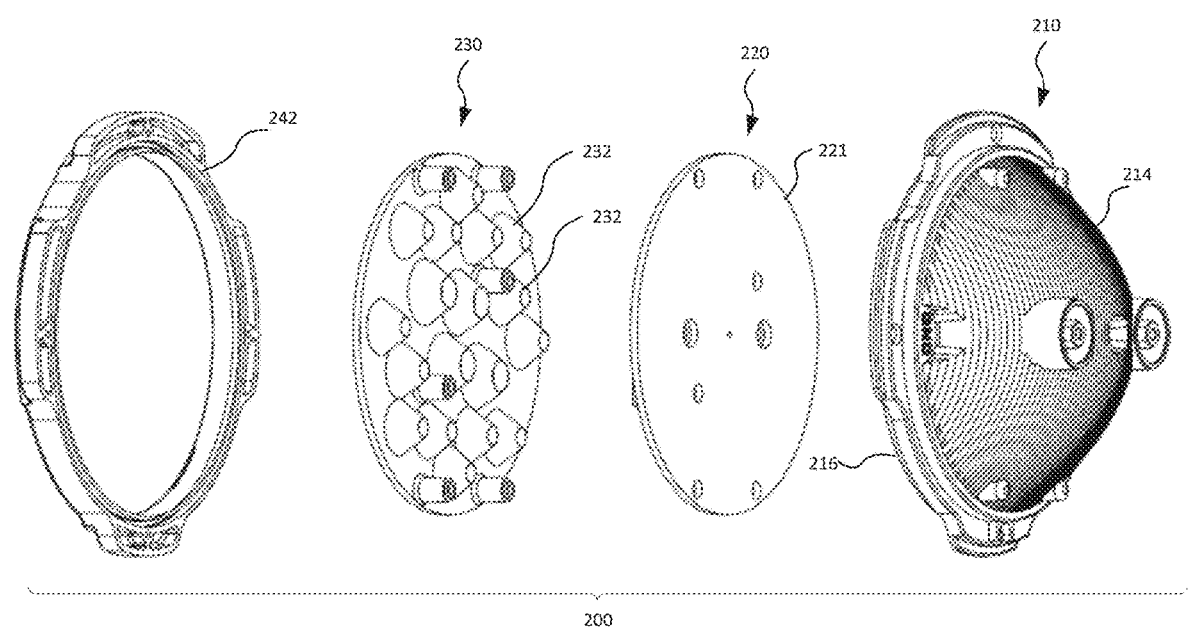
FIG. 3 is an exploded back perspective view of the wildlife deterrence aircraft lighting apparatus shown in FIG. 2.

Referring to FIGS. 2-6A, an embodiment of a wildlife deterrence aircraft lighting apparatus 200 providing both wildlife deterrence and aircraft lighting is shown and described in greater detail. The aircraft lighting apparatus 200 may be used, for example, as a landing light and/or taxi light on an airplane. As shown in FIGS. 2 and 3, this embodiment of the aircraft lighting apparatus 200 generally includes a housing 210, an LED holder 220 holding a plurality of LEDs 222a-d, a reflector arrangement 230, and a protective cover 240. When assembled, the LED holder 220 is located inside the housing 210 with the reflector arrangement 230 positioned over the LED holder 220 and the protective cover 240 positioned over a light exiting opening 212.

The LEDs 222a-d include one or more species deterrent LEDs 222a-c for providing non-lethal wildlife deterrence together with one or more aircraft lighting LEDs 222d for providing aircraft lighting such as landing lights and/or taxi lights. The species deterrent LEDs 222a-c may emit mono-colored light at a wavelength and intensity to perform the wildlife deterrence function, for example, as described above. The aircraft lighting LEDs 222d may emit white light for aircraft lighting. Multiple LEDs 222a-c may be used to provide the desired luminous flux for the aircraft lighting and wildlife deterrence functions. This embodiment of the aircraft lighting apparatus 200 thus provides both a non-lethal wildlife deterrence function and an aircraft lighting function in a single housing. As will be described in greater detail below, the aircraft lighting apparatus 200 may be designed and configured to provide both of these functions most effectively by reducing luminous flux loss and providing thermal management.

A back side of the housing 210 includes a mechanical interface for mounting the lighting apparatus 200 to an aircraft and an electrical interface for electrically connecting the lighting apparatus 200 to an aircraft power line, as will be described in greater detail below. The outside diameter of the housing 210 may conform to industry standard dimensions such that a metal clamping ring (not shown) may press against and hold the lighting apparatus 200 within a light receiving housing (not shown) on the aircraft. The housing 210 also includes a cooling body 214 including, for example, louver fins disposed along a back side thereof. The housing 210 and components thereof (e.g., louver fins) may be cast from aluminum. A cooling fan (not shown) may be positioned within the louvers location to assist in providing airflow through the louvers to increase the rate of thermal transfer away from the louvers. The design of the housing 210 is substantially circular and cylindrical, although also other forms for the housing 210 can be used.

A front side of the housing 210 is configured to be secured to the protective cover 240. The example embodiment of the housing 210 includes an edge ring 216 around the edge of the light exiting opening 212 for mating with a frame 242 of the protective cover 240 to secure the protective cover 240 to the housing 210 and provide an environmental seal to the interior airspace of the landing light. As shown in greater detail in FIGS. 6 and 6A, the edge ring 216 of the housing 210 includes ridges 217 that mate with the cover frame 242, and fasteners 218 (e.g., screws) secure the housing 210 to the cover frame 242. The protective cover 240 may be fabricated from molded polycarbonate or similar material that allows light to pass through.

As shown in FIGS. 4 and 5, the housing 210 and the cover frame 242 include one or more air slots 217, 217a around a perimeter to allow air flow between the forward facing side (FIG. 4) and the backward facing side (FIG. 5). The air may thus flow across the cooling body 214 to enhance the transfer of waste heat from the lighting apparatus. The protective cover 240 also includes one or more depressions 244 on a front surface corresponding to the larger air slots 217a to laminar flow and aid in providing airflow to the larger air slots 217a. Although one configuration of air slots and depressions is shown, other configurations (e.g., different sizes, numbers and shapes) are within the scope of the present disclosure.

As shown in greater detail in FIGS. 5 and 6, power terminals 250 extend through the housing 210 to make an electrical connection between the aircraft power supply and the electronic components located inside the interior space of the housing 210. The power terminals 250 may be made of a non-corrosive electrically conductive material. A non-electrically conductive material 252, 254 (e.g., a potting material) surrounds each of the power terminals 250 to provide electrical and environmental isolation. As shown in FIG. 6, a first portion 252 of non-electrically conductive material surrounds the base of the power terminal 250 to provide electrical isolation where the power terminal 250 passes through the housing 210 and a second portion 254 of non-electrically conductive material environmentally seals the housing 210 while providing electrical isolation between the power terminal 250 and the housing 210.

An air vent 256 also passes through the housing 210 into the interior airspace 213 within the housing 210 to allow for equalization of pressure inside the interior airspace with the exterior air pressure. A moisture barrier material 258 surrounds and protects the air vent to prevent moisture from entering while allowing pressure equalization.

The LED holder 220 and the reflector arrangement 230 both have a generally round shape and are sized to fit inside and mate with the housing 210 with the reflector arrangement 230 positioned over the LED holder 220. The LED holder 220 includes a substrate material 221 on which the LEDs 222a-d are mounted. As shown in FIGS. 6 and 6A, the substrate material 221 is located against an inside surface 211 of the housing 210 and a thermally conductive material 223, such as a thermally conductive pad or gel, may be used between the substrate material 221 and the inside surface 211 of the housing 210 to enhance thermal conduction. The air vent 256 also passes through the substrate material 221 and the thermally conductive material 223 into the interior airspace 213.

The LEDs 222a-d may include individual LED chips or groupings of LED chips mounted to the substrate material 221 of the LED holder 220. The reflector arrangement 230 includes reflector sections 232 corresponding to the individual LED chips or groupings of LED chips to reflect the light emitted from the LEDs 222a-d in a direction toward the light exiting opening 212 as shown by arrows 2 in FIG. 6A. In some embodiments, groupings of LED chips corresponding to each reflector section 232 may include LED chips emitting the same wavelengths (e.g., all white LEDs, all blue LEDs, all near UV LEDs or all UV LEDs) or may include a mixture of different LEDs (e.g., white LEDs with different species deterrent LEDs or different species deterrent LEDs). The LED chips may be grouped and arranged on the LED holder 220 in a manner that avoids thermal hotspots.

The reflector sections 232 may include curved (e.g., parabolic) reflectors or total internal reflection (TIR) lenses/ optics to collect and direct the light in the same general direction substantially parallel to a longitudinal axis of the apparatus 200. Additionally or alternatively, other optics may also be used including, without limitation, an aspheric lens. The reflector sections 232 and other optics may direct and focus the light to minimize or reduce luminous flux loss. In particular, the reflector sections 232 and other optics provide a relative large focal length and relatively small beam angle to achieve a sufficiently high intensity at the peak for both the aircraft lighting and wildlife deterrence functions.

The optical emission pattern may conform to the Aerospace Recommended Practice ARP693 Rev D. and ARP5825A requirements. These requirements include landing light design objective of 21.5 lux (2 ft-c) minimum at 122 m (400 ft) in front of the pilot at touch down attitude when measured normal to the light beam, and a taxi light design objective of 5.4 lux (0.5 ft-c) minimum at 91 m (300 ft) in front of the pilot during ground roll when measured normal to the light beam. The minimum illumination (typically 50% peak power) may be maintained to 10 feet outboard of the most extreme wingtip structure of the aircraft at 91 m (300 ft).

In addition to supporting the LEDs 222a-d, the LED holder 220 may support one or more LED drivers for driving the LEDs 222a-d and one or more controllers for controlling the LED drivers and the operation of the LEDs 222a-d. The LED driver(s) may include known LED driver circuits and may power either an individual LED or multiple LEDs. The controller may control the pulse width modulation of the LEDs 222a-d by controlling the ON/OFF state of the LED driver(s) and the pulse rate of the LEDs 222a-d. The LED holder 220 may also support a thermistor to monitor the temperature of the LEDs 222a-d and a voltage monitor to monitor voltage. The controller may adjust the pulse rate of the LEDs 222a-d in response to the monitored voltage and the monitored temperature to reduce the duty cycle of the LEDs 222a-d to maintain the voltage in a range sufficient for powering at least the aircraft lighting LEDs 222d and to maintain the temperature below a maximum operating temperature of the LEDs, as will be described in greater detail below. The controller may include logic control circuitry known to those skilled in the art for controlling LEDs.

In an embodiment, the species deterrent LEDs 222a-c include a combination of one or more blue LEDs 222a, near UV LEDs 222b, and UV LEDs 222c and the aircraft lighting LEDs 222d include white light LEDs producing white light for the aircraft lighting function (e.g., landing and/or taxi lights). The blue colored LEDs 222a may be pulsed at a rate in a range of 50 Hz to 100 Hz, which is imperceptible to humans while providing deterrence for some avian species. The near UV LEDs 222b and UV LEDs 222c correspond to VS and UVS cone peak spectral sensitivity of avian species and may be pulsed at a rate in a range of 1 Hz to 10 Hz. Accordingly, the light being reflected by the respective reflector sections 232 through the light exiting opening 212 includes multiple colors of light being independently pulsed in different regions.

Figure 7:
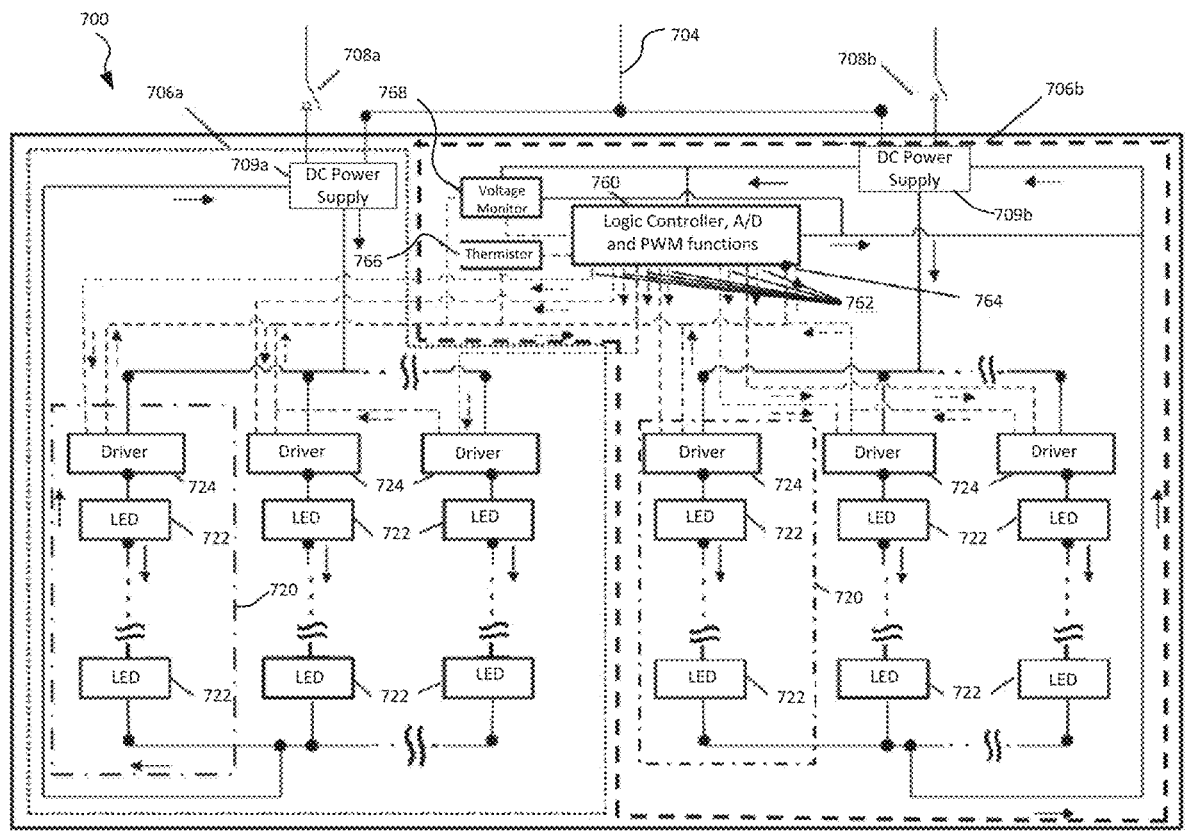
FIG. 7 is a block diagram of a system for controlling a combined wildlife deterrence and aircraft lighting apparatus, consistent with embodiments of the present disclosure.

Referring now to FIG. 7, an embodiment of a control system for a combined wildlife deterrence and aircraft lighting apparatus 700 is shown and described in greater detail. The lighting apparatus 700 and the control system may be powered from a single aircraft power line 704. The lighting apparatus 700 may be divided into multiple segments, such as a landing light segment 706a and taxi light segment 706b that are controlled by separate aircraft power circuits 708a, 708b. Each of the segments 706a, 706b include a DC power supply 709a, 709b and one or more LED strings 720.

Each LED string 720 includes one or more LEDs 722 (e.g., LED dies) and an LED driver 724. The LEDs 722 may be connected in series or parallel and matched to the voltage provided by the DC power supply 709a, 709b. The LED drivers 724 may include LED driver circuits known for driving a string of LEDs. Each LED driver 724 may have additional resistor and capacitor components such that feedback to the LED driver 724 from the respective LED string 720 enables control of the amperage provided to the LED string 720. Each LED string 720 may have additional Zener diode components to provide protection to the LED string 720 by providing a more uniform power load to the resistor and capacitor components, which provides feedback to the LED driver 724 in the event of a failure of one or more LEDs 722 in the LED string 720.

The LED strings 720 may include LEDs 722 capable of emitting different bandwidth and peak spectrum wavelength of light ranging between 680 nm and 350 nm, for example, as discussed above. Each LED string 720 may include LEDs of a common type/function (e.g., aircraft lighting LEDs and species deterrent LEDs) to allow the LEDs of the same type to be controlled together and independently of other types of LEDs. In one example, one LED string may include aircraft lighting LEDs (e.g., white light LEDs) and another LED string may include species deterrent LEDs (e.g., monocolored LEDs of at least one wavelength). In a further example, one LED string may include aircraft lighting LEDs emitting white light, one LED string may include species deterrent LEDs emitting blue light, one LED string may include species deterrent LEDs emitting near UV light, and one LED string may include species deterrent LEDs emitting UV light. Various other combinations of LED strings with LEDs of different wavelengths are within the scope of the present disclosure.

The control system further includes a logic controller 760 electrically connected to each of the LED strings 720 for controlling the operation of the LED strings 720 independently. The logic controller 760 is coupled to the LED drivers 724 with control inputs 762 and electrical return lines 764 and includes one or more electronic components providing a pulse width modulation function. The control system may also include a thermistor 766 for monitoring temperature within the lighting apparatus and a voltage monitor 768 for monitoring a voltage delivered to the LED strings 720. The logic controller 760 may be coupled to the thermistor 766 and the voltage monitor 768 to enable A/D input for voltage monitoring and temperature control. The logic controller 760 may include circuitry, hardware, software and/or firmware known for use in controlling LED strings and may operate at a frequency of at least 10 Hz and preferably at a frequency greater than 1000 Hz.

The switching ON/OFF of each LED driver 724 occurs when it receives a pulse width modulation signal over a control input 762 from the logic controller 760 resulting in the electrical connection to one or more LEDs 722 in that LED string 720 being energized. The logic controller 760 may control the pulse width modulation, for example, according to illumination requirements of the flight crew, the avian species to be deterred, the maximum allowable thermal temperature of the LEDs and other electronic components, and/or the failure of the aircraft power supply to meet the DC voltage requirements of the LEDs and other electronic components. The logic controller 760 may control the pulse width modulation of different LED strings 720 differently. An LED string with aircraft lighting LEDs may be pulsed differently, for example, than an LED string with species deterrent LEDs. The logic controller 760 may also control the pulse width modulation to provide a thermal over temperature protection function while also performing primarily the aircraft lighting function and secondarily the wildlife deterrence function, as described in greater detail below. In general, the thermal over temperature protection function involves controlling the LEDs in response to a monitored temperature to maintain a temperature of the LEDs below a maximum allowable operating temperature.

The control system may also include redundant logic controllers (e.g., one in each of the segments 706a, 706b) to facilitate independent operation of the landing light segment 706a and the taxi light segment 706b. The separate aircraft power circuits 708a, 708b may provide either AC or DC voltage to energize the DC power supplies 709a, 709b that provide voltage and amperage matched to the circuitry requirements of the logic controller 760 (or redundant logic controllers) and the LED strings 720. In one example, when separate aircraft power circuits 708a, 708b are utilized, the taxi light segment 706a is energized whenever the landing light segment 706b is energized.

Figure 8:
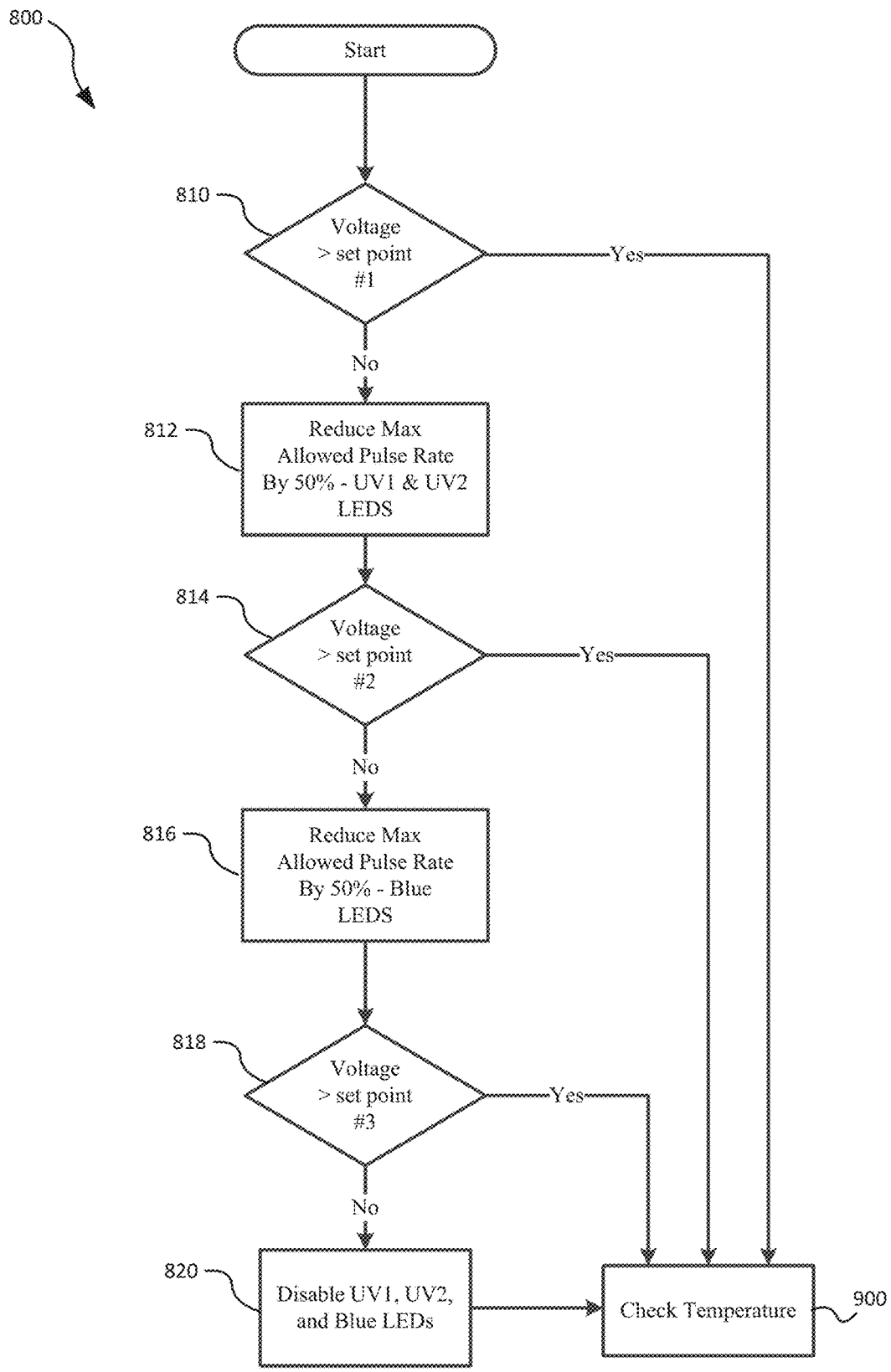
FIG. 8 is a flow diagram of a voltage control method for operating a combined wildlife deterrence and aircraft lighting apparatus in response to a monitored voltage, consistent with embodiments of the present disclosure.
Figure 9:
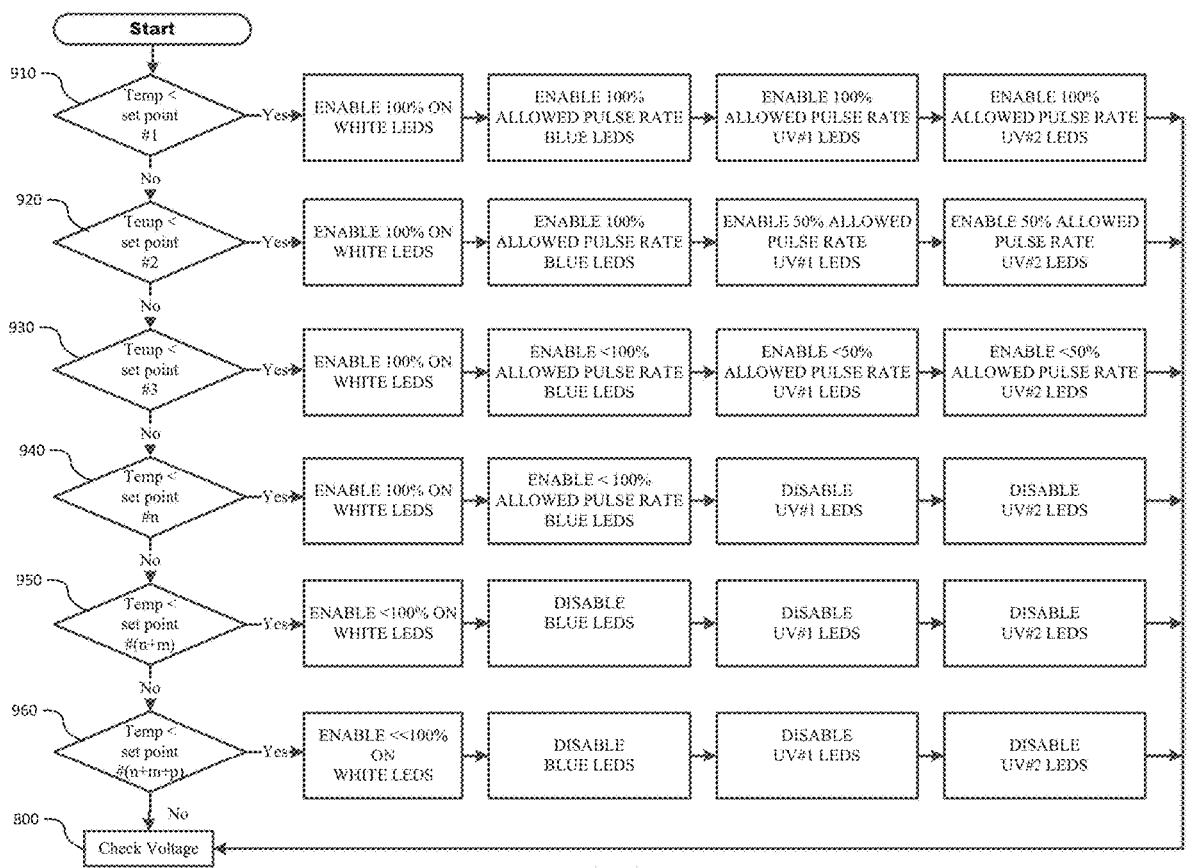
FIG. 9 is a flow diagram of a temperature control method for operating a combined wildlife deterrence and aircraft lighting apparatus in response to a monitored temperature, consistent with embodiments of the present disclosure.

Referring now to FIGS. 8 and 9, example methods for controlling a combined non-lethal wildlife deterrence and aircraft lighting apparatus are shown and described in greater detail. In these example methods, the species deterrent LEDs in the lighting apparatus being controlled include blue LEDs, near UV (UV1) LEDs and UV (UV2) LEDs. In general, the voltage control method 800 shown in FIG. 8 controls the LEDs to maintain a sufficient operating voltage delivered to the LEDs and electronic components (e.g., primarily to the white aircraft lighting LEDs and secondarily to the species deterrent LEDs). The temperature control method 900 shown in FIG. 9 controls the LEDs such that a temperature proximate the LEDs is maintained below a maximum allowable operating temperature for the LEDs and electronic components. Both methods may be performed together using the logic controller 760 in the system shown in FIG. 7.

The example voltage control method 800 determines 810, 814, 818 if the monitored voltage is greater than a series of set points and controls the species deterrent LEDs accordingly, for example, by reducing 812, 816 the pulse rate of one or more types of species deterrent LEDs and/or disabling 820 one or more types of species deterrent LEDs as needed. If the monitored voltage is determined 810 to be higher than a first set point (i.e., the highest voltage set point), sufficient voltage is being supplied and the controller may proceed with the temperature control method 900. If the monitored voltage is not greater than the first set point, the allowed pulse rate is reduced 812 for at least some of the species deterrent LEDs (e.g., by 50% for the UV1 and UV2 LEDs). The method 800 may then determine 814, 818 if the monitored voltage is greater than lower set points (e.g., set point #2 and set point #3) and reduce 816 the pulse rate and/or disable 820 LEDs further as needed. In this example, the allowed pulse rate is reduced 816 for additional species deterrent LEDs (e.g., by 50% for the blue LEDs) if the monitored voltage is not greater than a second set point, and the UV1, UV2 and blue LEDs are disabled 820 if the monitored voltage is not greater than a third set point.

As such, the voltage control method 800 gradually reduces the pulse rate and/or disables species deterrent LEDs until the voltage is sufficient, thereby enabling the maximum possible output within the voltage constraints. Other variations of the voltage control method 800 are within the scope of the present disclosure. The voltage control method may use, for example, fewer or greater set points and may reduce the pulse rates by different amounts and/or disable only certain types of LEDs.

The example temperature control method 900 determines 910, 920, 930, 940, 950, 960 if a monitored temperature is less than a series of set points and controls the LEDs accordingly, for example, by reducing the pulse rates of one or more types of LEDs and/or disabling one or more types of LEDs. All of the LEDs may be enabled 100%, for example, if the monitored temperature is determined 910 to be less than a first set point (i.e., the lowest temperature set point). If the monitored temperature is not below the first set point, the method 900 determines 920, 930, 940, 950, 960 if the monitored temperature is below additional higher set points and reduces the pulse rate and/or disables one or more types of the species deterrent LEDs accordingly. If the monitored temperature is determined 920 to be less than a second set point, for example, the pulse rate is reduced for the UV1 and UV2 LEDs (e.g., enabled at 50% of the allowed pulse rate) but not reduced for the white LEDs and the blue LEDs. If the monitored temperature is not less than the second set point but is determined 930 to be less than a third set point, the pulse rate is further reduced for the UV1 and UV2 LEDs (e.g., enabled at <50% of the allowed pulse rate) and reduced for the blue LEDs (e.g., enabled at <100% allowed pulse rate) but not reduced for the white LEDs. If the monitored temperature is not less than the third set point, the method 900 may continue to compare the monitored temperature to additional higher set points (n, n+m, n+m+p) and further reduce the pulse rate and/or disable LEDs as needed. The example method 900 reduces the pulse rate and disables LEDs according to a priority, for example, the UV1 and UV2 LEDs are reduced and disabled first and then the blue LEDs. The white LEDs may be enabled at less than 100% after the species deterrent LEDs have been disabled but may remain ON to provide aircraft lighting functions.

As such, the temperature control method 900 reduces the pulse rate and/or disables LEDs only as needed depending upon the monitored temperature, thereby enabling the maximum possible output within the temperature constraints. Other variations of the temperature control method 900 are within the scope of the present disclosure. The temperature control method may use, for example, fewer or greater set points and may reduce the pulse rates by different amounts and/or disable the LEDs differently.

Accordingly, a wildlife deterrence lighting apparatus, consistent with embodiments of the present disclosure, provides effective, non-lethal wildlife deterrence on an aircraft. Embodiments of the wildlife deterrence lighting apparatus effectively combine the non-lethal wildlife deterrence function with aircraft lighting functions within the voltage and temperature constraints of the lighting apparatus.

Throughout the entirety of the present disclosure, use of the articles "a" or "an" to modify a noun may be understood to be used for convenience and to include one, or more than one of the modified noun, unless otherwise specifically stated.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An aircraft lighting apparatus comprising:
a plurality of light emitting diodes (LEDs) configured to generate light and direct the light from an aircraft to a deterrence area in a flight path of the aircraft, wherein at least one of the LEDs is a species deterrent LED configured to emit mono-colored light at a wavelength within a sensitivity range of a short-wavelength-sensitive (SWS) photoreceptor of at least one avian species and with a light intensity in at least a portion of the deterrence area sufficient to cause a temporary disruption of visual perception in the at least one avian species to induce an augmented behavioral response in the avian species resulting in avoidance of the deterrence area by the avian species.

2. The aircraft lighting apparatus of claim 1 wherein the species deterrent LED is configured to emit mono-colored light at a wavelength within a sensitivity range of a violet sensitive (VS) cone of the avian species and/or an ultraviolet sensitive (UVS) cone of the avian species.

3. The aircraft lighting apparatus of claim 1 wherein the species deterrent LED is configured to generate mono-colored light of at least one wavelength within 25 nm of a peak absorption wavelength of the SWS photoreceptor of the avian species.

4. The aircraft lighting apparatus of claim 1 wherein the species deterrent LED is configured to emit mono-colored light with a light intensity of greater than $10^{-6}$ W/cm$^2$ in at least a portion of the deterrence area.

5. The aircraft lighting apparatus of claim 1 wherein at least one of the LEDs is an aircraft lighting LED configured to emit white light.

6. The aircraft lighting apparatus of claim 1 wherein the species deterrent LED includes at least one of a blue light LED with a bandwidth of less than +/−15 nm and a peak spectrum emission between 400 nm and 470 nm, a near ultraviolet (UV) light LED with a bandwidth of less than +/−15 nm and a peak spectrum emission between 380 nm and 400 nm, and an ultraviolet (UV) light LED with a band width of less than +/−15 nm and a peak spectrum emission between 355 nm and 380 nm.

7. The aircraft lighting apparatus of claim 1 further including at least one LED driver for driving the plurality of LEDs and at least one controller for controlling the at least one LED driver.

8. The aircraft lighting apparatus of claim 7 wherein the species deterrent LEDs include blue colored LEDs, and wherein the controller is configured to control a pulse rate of the blue colored LEDs in a range of 50 Hz to 100 Hz.

9. The aircraft lighting apparatus of claim 7 wherein the species deterrent LEDs include UV and near UV colored LEDs, and wherein the controller is configured to control a pulse rate of the UV and near UV colored LEDs in a range of 1 Hz to 10 Hz.

10. The aircraft lighting apparatus of claim 7 wherein the controller is configured to control pulse width modulation of at least one of the LEDs to maintain a temperature proximate the LEDs below a maximum operating temperature for the LEDs and other electronic components.

11. The aircraft lighting apparatus of claim 7 wherein at least one of the LEDs is a white light producing LED, and wherein the controller is configured to the species deterrent LED(s) and the white light LED(s) independently.

12. An aircraft lighting apparatus comprising:
a housing;
a plurality of light emitting diodes (LEDs) configured to generate light and direct the light from an aircraft to a deterrence area in a flight path of the aircraft, wherein the plurality of LEDs include at least one aircraft lighting LED configured to emit white light to perform an aircraft lighting function and at least one species deterrent LED configured to emit light at a wavelength to perform a wildlife deterrence function, wherein both the at least one aircraft lighting LED and the at least one species deterrent LED are located in the housing;
at least one LED driver coupled to the LEDs for driving the LEDs; and
at least one controller coupled to the at least one LED driver and configured to control the aircraft lighting LED(s) and the species deterrent LED(s) independently to perform the aircraft lighting function and the wildlife deterrence function in a concurrent mode of operation such that the wildlife deterrence function does not interfere with the aircraft lighting function.

13. The aircraft lighting apparatus of claim 12 wherein the controller is configured to control the aircraft lighting LED(s) and the species deterrent LED(s) to maintain a temperature proximate the LEDs below a maximum operating temperature for the LEDs.

14. The aircraft lighting apparatus of claim 12 wherein the controller is configured to the aircraft lighting LED(s) and the species deterrent LED(s) to maintain a sufficient operating voltage delivered to the LEDs.

15. The aircraft lighting apparatus of claim 12 wherein the controller is configured to control pulse width modulation of the LEDs.

16. The aircraft lighting apparatus of claim 12 wherein the controller is configured to reduce a pulse rate of at least a portion of the species deterrent LEDs and/or disable at least a portion of the species deterrent LEDs without affecting the aircraft lighting LEDs to maintain a temperature proximate the LEDs below a maximum operating temperature for the LEDs and/or to maintain a sufficient operating voltage delivered to the LEDs.

17. The aircraft lighting apparatus of claim 12 wherein the at least one species deterrent LED is configured to emit mono-colored light.

18. The aircraft lighting apparatus of claim 12 wherein the at least one species deterrent LED is configured to emit mono-colored light at a wavelength within a sensitivity range of a short-wavelength-sensitive (SWS) photoreceptor of at least one avian species.

19. The aircraft lighting apparatus of claim 12 wherein the at least one species deterrent LED includes at least one of a blue LED, a near UV LED, and a UV LED.

20. The aircraft lighting apparatus of claim 12 wherein the plurality of LEDS include a plurality of LED strings, at least one of the LED strings including an LED driver and a plurality of aircraft lighting LED and at least one of the LED strings including an LED driver and a plurality of species deterrent LEDs.

21. An aircraft lighting apparatus comprising:
a housing defining a light exiting opening;
an LED holder located in the housing;
a plurality of light emitting diodes (LEDs) arranged on the LED holder in the housing, wherein the plurality of LEDs include at least one aircraft lighting LED configured to emit white light to perform an aircraft lighting function and at least one species deterrent LED configured to emit light at a wavelength to perform a wildlife deterrence function, wherein both the at least one aircraft lighting LED and the at least one species deterrent LED are located in the housing and emit light through the light exiting opening; and
a reflector arrangement located in the housing and including a plurality of reflector sections corresponding to the plurality of LEDs, the reflector sections being configured to reflect light in a longitudinal direction toward the light exiting opening and to reduce luminous flux loss; and
a protective cover lens covering the light exiting opening and allowing the light to pass through.

22. The aircraft lighting apparatus of claim 21 wherein each of the reflector sections includes a curved reflector and each of the LEDs is arranged along an optical axis of a respective one of the reflector sections.

23. The aircraft lighting apparatus of claim 21 wherein each of the reflector sections includes a TIR lens and each of the LEDs is arranged along an optical axis of a respective one of the reflector sections.

24. The aircraft lighting apparatus of claim 21 wherein the LED holder is thermally coupled to the housing to provide thermal conduction from the LEDs to a cooling body on the housing.

25. The aircraft lighting apparatus of claim 21 wherein the protective cover defines at least one air slot and a depressed surface corresponding to the air slot to allow air to flow to a back portion of the housing.

* * * * *